United States Patent
McClain

(10) Patent No.: US 9,732,163 B2
(45) Date of Patent: Aug. 15, 2017

(54) HIGH VISCOSITY CROSSLINKED ETHOXY-STARCH

(71) Applicant: Archer Daniels Midland Company, Decatur, IL (US)

(72) Inventor: James McClain, Bettendorf, IA (US)

(73) Assignee: Archer Daniels Midland Co., Decatur, IL (US)

( * ) Notice: Subject to any disclaimer, the term of this patent is extended or adjusted under 35 U.S.C. 154(b) by 0 days.

(21) Appl. No.: 14/653,464

(22) PCT Filed: Jan. 2, 2014

(86) PCT No.: PCT/US2014/010038
§ 371 (c)(1),
(2) Date: Jun. 18, 2015

(87) PCT Pub. No.: WO2014/107491
PCT Pub. Date: Jul. 10, 2014

(65) Prior Publication Data
US 2015/0307632 A1    Oct. 29, 2015

Related U.S. Application Data

(60) Provisional application No. 61/748,484, filed on Jan. 3, 2013.

(51) Int. Cl.
| | |
|---|---|
| C08B 31/00 | (2006.01) |
| C08B 31/10 | (2006.01) |
| C08L 3/04 | (2006.01) |
| C04B 24/38 | (2006.01) |
| C04B 28/14 | (2006.01) |
| C09K 8/68 | (2006.01) |
| C09K 8/90 | (2006.01) |
| C09K 8/62 | (2006.01) |

(Continued)

(52) U.S. Cl.
CPC ............ *C08B 31/006* (2013.01); *C04B 24/38* (2013.01); *C04B 28/145* (2013.01); *C08B 31/10* (2013.01); *C08L 3/04* (2013.01); *C09K 8/62* (2013.01); *C09K 8/68* (2013.01); *C09K 8/90* (2013.01); *E04B 9/04* (2013.01); *C04B 2103/0062* (2013.01)

(58) Field of Classification Search
CPC ....... C04B 24/38; C04B 28/145; C04B 14/48; C04B 22/0013; C04B 2103/0062; C08B 31/006; C08B 31/10; C08L 3/04; C09K 8/62; C09K 8/68; C09K 8/90; E04B 9/04
USPC .......................................................... 507/212
See application file for complete search history.

(56) References Cited

U.S. PATENT DOCUMENTS

| | | | | |
|---|---|---|---|---|
| 5,009,911 A | * | 4/1991 | Mauro | A23L 29/212 127/32 |
| 5,085,228 A | * | 2/1992 | Mooney | A24C 5/24 131/37 |
| 5,139,809 A | * | 8/1992 | Wienen | A23C 9/1544 127/32 |

\* cited by examiner

*Primary Examiner* — Frances Tischler
(74) *Attorney, Agent, or Firm* — Vincent T. Kung

(57) ABSTRACT

Described herein is an ethoxylated starch crosslinked with a cross linking agent having surprisingly high viscosity in water. The ethoxylated crosslinked starch described has a degree of ethoxy substitution from 1% to 3% and the crosslinking agent is from 0.02% to 0.05% of the weight of starch. Within this narrow range of values, a 7% wt/wt aqueous solution of the crosslinked ethoxylated starch exhibits a viscosity of at least 1600 cps at 95 ° C. This ethoxylated crosslinked starch is particularly useful in the formation of ceiling tiles with stucco, borax and steel wool, and should be useful in enhancing the viscosity of hydraulic fracturing fluids.

16 Claims, 1 Drawing Sheet

(51) Int. Cl.
*E04B 9/04* (2006.01)
*C04B 103/00* (2006.01)

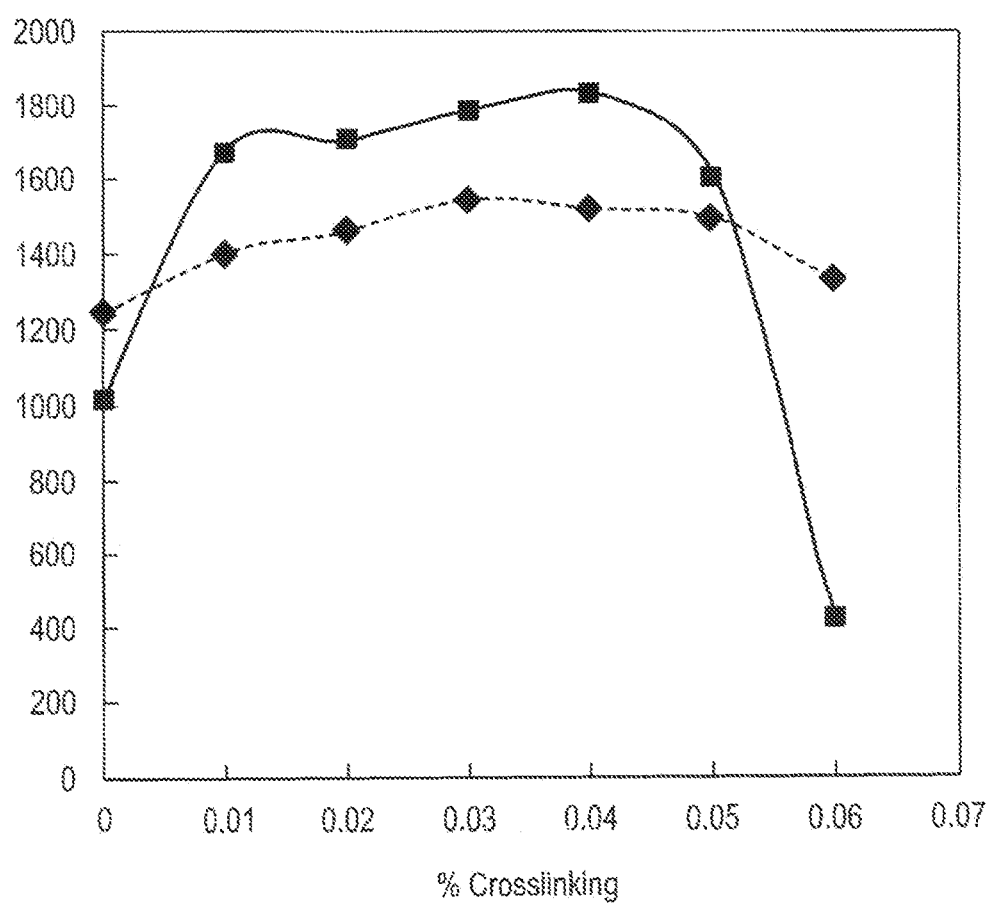

HIGH VISCOSITY CROSSLINKED ETHOXY-STARCH

CROSS REFERENCE TO RELATED APPLICATIONS

This application is a national phase entry of PCT application No. PCT/US2014/010038 filed on Jan. 2, 2014, which claims priority to U.S. provisional patent application No. 61/748,484 filed Jan. 3, 2013.

SUMMARY OF THE INVENTION

Described herein is an ethoxylated starch crosslinked with a cross linking agents, wherein the degree of ethoxy substitution on the starch is from 1% to 3%; the crosslinking agent is from 0.02% to 0.05% of the weight of starch; and a 7% wt/wt aqueous solution of the crosslinked ethoxy starch exhibits a viscosity of at least 1600 cps at 95° C. In a typical embodiment the ethoxylated crosslinked starch has a degree of substitution from 1.4% to 2.4%. Any crosslinking agent may be used. In exemplary embodiments the cross linking agent is epichlorohydrin. In the most desirable embodiments the 7% solution exhibits a viscosity of 1700-1900 cps. In exemplary embodiments the 7% solution exhibits a viscosity of 1700-1800 cps.

Also described is the use of the ethoxylated crosslinked starch to form ceiling tiles from a mixture comprising the ethoxylated crosslinked starch combined with borax, stucco, steel wool in water. In a general embodiment with respect to the volume of water, the amount of borax is 0.15%-0.35% wt/vol, the stucco is 4%-5% wt/vol and the ethoxylated crosslinked starch is 3.25%-4.25% wt/vol. In an more specific embodiment the borax is about 0.25%, wt/vol and the stucco is about 4.5% wt/vol. In another more specific embodiment the crosslinked ethoxylated starch is 3.25% to 4% wt/vol.

The ethoxylated crosslinked starch of the present invention is also useful in hydraulic fracturing fluids as a viscosity enhancing agent.

BRIEF DESCRIPTION OF THE DRAWINGS

FIG. 1 is a graph illustrating the effects of crosslinking degree (expressed as % crosslinking on the x axis) on viscosity (expressed in centipoise on the y axis as measured using a 7% aqueous solution at 95° C.) of ordinary corn starch (♦) in comparison to ethoxylated corn starch (■) having a 1.8% degree of ethoxy substitution.

DETAILED DESCRIPTION

The present disclosure is directed to the surprising discovery that ethoxylated starch having a certain defined degree of substitution combined, with a crosslinking agent within a certain defined, range of crosslinking, together operate to produce a crosslinked ethoxylated starch having a significantly higher viscosity than can foe obtained using ordinary starch or ethoxy substituted starch alone. The degree of substitution of the ethoxy groups on the starch refers to the percentage of sugar residues in the starch that are ethoxylated. The degree of substitution should be in the range of 1% to 3%. In a more narrow range for particular embodiments the degree of substitution should be in the range of 1.4% to 2.4%. A 1.8% degree of substitution represents a typical embodiment.

The degree of crosslinking should be in the range of 0.015% to 0.05%. Degree of crosslinking is defined as the ratio of crosslinking agent to starch on a wt/wt basis used in the crosslinking reaction. It is believed that all, or nearly all of the crosslinking agent is converted in the reaction so that the degree of crosslinking is equal to the ratio of crosslinking agent to starch used in the reaction. However, it has not been chemically proven that all of the crosslinking agent is converted, hence, to resolve any ambiguity, the degree of crosslinking is hereby defined as the ratio of materials used in the reaction, regardless of whether the ultimate crosslinked ethoxy starch product precisely has the same wt/wt ratio of crosslinking agent to starch.

FIG. 1 illustrates the surprising effect of the combination of crosslinking and ethoxylation of starch on viscosity. The data shown in FIG. 1 is based on comparing ordinary corn starch to ethoxylated corn starch that had been substituted to a degree of 1.8%. Without any crosslinking agent the ethoxylated starch with this degree of substitution is actually less viscous than ordinary starch by about −20%. However, when the ethoxylated starch is crosslinked to within the range of 0.015% to 0.05% the viscosity is substantially increased. At a crosslinking ratio of 0.02% to 0.04% the viscosity surpasses that achievable by crosslinking ordinary starch by +16% to +20%. Higher degrees of crosslinking however begin to reverse that trend, so ethoxylated starch crosslinked to a ratio higher than 0.05% again demonstrates less viscosity than ordinary starch crosslinked to the same degree. The viscosity measurements depicted in FIG. 1 were determined using a Rapid Visco Analyzer (RVA) meter with an aqueous solution containing 7% wt/vol of the starch or ethoxylated starch and was measured at a temperature of 95° C.

Strikingly, the increase of viscosity exhibited by ethylene oxide cross linked starch reaching in the range of 1600-1900 cps is not observed with propylene oxide crosslinked starch, which is commonly used in food applications to increase the viscosity of food products such as yogurts, puddings and the like. The maximum viscosity achieved using propylene oxide rather than ethylene oxide to crosslink the starch was about 1380 cps, which was achieved at a cross linking ratio of epichlorhydrin of 0.01%. Higher degrees of crosslinking up to 0.03% did not improve the viscosity of the propylene oxide cross linked starch, and in fact showed less viscosity.

Crosslinked ethoxylated starch with the increased viscosity characteristics described herein are particularly useful for the formation of industrial materials molded in a process that requires drying aqueous solutions of reagents in a form. One particular embodiment where the crosslinked ethoxylated starch was shown to be particularly useful is in the formation of ceiling tiles. Ceiling tiles are made by forming a mixture of borax, (0.15%-0.35% wt/vol) stucco (4%-5% wt/vol) and starch (4%-5% wt/vol) in water with steel wool that is cooked at a temperature of 180-210° F. then poured into an open face mold and dried. In the most common formulations the borax is about 0.25%, the stucco is about 4.5% and the starch is about 4.5%. The purpose of the starch, is to increase the viscosity of the mixture so that the mold holds its form along the edges when dried. The higher viscosity also permits easier imprinting of texture features on the front face of the ceiling tiles by running them through a stamping die. Use of ethoxylated crosslinked starch in lieu of starch for such a process can provide the same levels of viscosity using 5% to 20% less amounts of the ethoxylated starch than would be required using ordinary starch.

Accordingly another aspect of the present disclosure is a mixture for forming a ceiling comprising, at least 90% wt/vol water, 0.15%-0.35% wt/vol borax, 4%-5% wt/vol stucco, steel wool, and 3.25%-4.25% wt/vol crosslinked ethoxy substituted starch, wherein the degree of ethoxy substitution on the starch is from 1% to 3%; the crosslinking agent is from 0.02% to 0.05% of the weight of starch; and a 7% wt/wt aqueous solution of the crosslinked ethoxy starch exhibits a viscosity of at least 1600 cps at 95° C. In preferred formulations the amount, of the ethoxy substituted starch is starch is 3.25% to 4% wt/vol.

Another application for ethoxylated starch is in hydraulic fracturing fluids (tracking fluids) used to release hydrocarbons from shale and other mineral deposits. Fracking fluids typically utilize a viscosity enhancing agent in a water slurry with popping agents, gelling agents and other materials. Use of ethoxylated crosslinked starch as a viscosity enhancing agent provides greater latitude in adjusting the viscosity of such fluids. Accordingly, another aspect of the present invention is a tracking fluid containing a viscosity enhancing agent comprised of ethoxy substituted starch, wherein the degree of ethoxy substitution on the starch is from 1% to 3%; the crosslinking agent is from 0.02% to 0.05% of the weight of starch; and a 7% wt/wt aqueous solution of the crosslinked ethoxy starch exhibits a viscosity of at least 1600 cps at 95° C.

A method of making the ethoxylated starch compound having such a high viscosity Includes contacting a suspension of starch in a 1-5% solution of NaCl in water with ethylene oxide at a wt/wt ratio of ethylene oxide to starch of 0.06 to 0.09, at an alkaline pH from 10-12. The salt at this concentration inhibits gelatinization of the starch that would otherwise occur at the reaction temperature, which should be in the range of 26.7° C. to 48.9° C. (i.e., 80-120° F.) for a period of 10 to 12 hours. Epichlorohydrin is subsequently added to the reaction mixture at 0.01% to 0.1% for a period of about 2 to 10 hours at the same temperature. The amount of crosslinking agent relative to starch is critical to obtain a required viscosity of at least 1600 cps, and most preferably 1700 to 1900 cps. The amount of crosslinking agent should be 0.02 to 0.05% the weight of the starch. Too little crosslinking agent will not increase the viscosity of the ethoxylated starch to the desired levels and too much crosslinking agent will actually decrease the viscosity obtained with lower amounts of crosslinking agent.

Suitable crosslinking agents include epichlorohydrin, organic diacids and triacids such as succinic acid, malic, fumaric, or citric acid, acrylates and amides thereof, such as acrylic acid, acroleion, acrylamide and bis acrylamide. Epichlorohydrin is a preferred crosslinking agent.

In exemplary methods a 3% solution of NaCl adjusted to pH 11-11.5 with NaOH is mixed with starch to form a suspension containing 40% wt/wt starch, and ethylene oxide is added to bring it to 2.9% wt/wt in the mixture. The mixture is reacted for 12 hours at 40.6° C. (i.e., 105° F.) followed by addition of 0.02% to 0.05% epichlorhydrin which was reacted for a further five hours. This yields an ethoxylated starch, which in a 7% aqueous solution, will have a peak viscosity of 1600-1.900 cps at 95° C. In one example, when the amount of epichlorhydrin was 0.025% the weight of the starch and the peak viscosity was 1740 cps for the 7% solution measured at 95° C.

Any starch may be used to make the crosslinked ethoxylated starch compositions described herein. Typical starches are corn and wheat starch—each being about 25% amylose and 75% amylopectin, potato and rice starch—each being about 20% amylose and 80% amylopectin, cassava (tapioca) starch being about 15-18% amylose and 82-85% amylopectin and waxy versions of the same. The waxy starch versions are those comprised of less than 10% amylose and at least 90% amylopectin. Ethoxylated and crosslinked waxy starches having the same degree of substitution and crosslinking described herein are expected to perform even better as viscosity enhancing agents due to the larger network of branching provided by the amylopectin molecule. Accordingly, lower amounts of crosslinked ethoxylated waxy starches are expected to provide the same improvements in viscosity than higher amounts of the crosslinked and ethoxylated ordinary starch varieties.

What is claimed is:

1. An ethoxylated starch crosslinked with a cross linking agent, wherein the degree of ethoxy substitution on the starch is from 1% to 3%; the crosslinking agent is from 0.01% to 0.05% of the weight of starch; and a 7% wt/wt aqueous solution of the crosslinked ethoxy starch exhibits a viscosity of at least 1600 cps at 95° C., wherein said viscosity surpasses that of a crosslinked starch not having an ethoxy substitution from 1% to 3% and having less than 0.01% or greater than 0.05% crosslinking by +16% to +20%.

2. The ethoxylated crosslinked starch of claim 1 where the degree of substitution is from 1.4% to 2.4%.

3. The ethoxylated crosslinked starch of claim 1 wherein the cross linking agent is epichlorohydrin.

4. A mixture comprising the ethoxylated crosslinked starch of claim 1 combined with borax, stucco, steel wool in water.

5. The mixture of claim 4 wherein with respect to the volume of water, borax is 0.15%-0.35% wt/vol, the stucco 4%-5% wt/vol and the ethoxylated crosslinked starch is 3.25% to 4.25% wt/vol.

6. The mixture of claim 5 wherein the borax is about 0.25%, wt/vol and the stucco is about 4.5% wt/vol.

7. The mixture of claim 5 wherein and the crosslinked ethoxylated starch is 3.25% to 4% wt/vol.

8. The ethoxylated starch of claim 1 wherein the 7% solution exhibits a viscosity of 1700-1900 cps.

9. The ethoxylated starch of claim 1 wherein the 7% solution exhibits a viscosity of 1700-1800 cps.

10. The ethoxylated starch of claim 1 wherein the starch is corn starch.

11. The ethoxylated starch of claim 1 wherein the starch is a waxy starch.

12. A hydraulic fracturing fluid having a viscosity enhancing agent comprised of the crosslinked ethoxylated starch according to claim 1.

13. A ceiling tile made from the mixture of claims 4.
14. A ceiling tile made from the mixture of claims 5.
15. A ceiling tile made from the mixture of claims 6.
16. A ceiling tile made from the mixture of claims 7.

* * * * *